United States Patent
Eriksen et al.

(10) Patent No.: US 11,680,587 B2
(45) Date of Patent: Jun. 20, 2023

(54) BRAKE CYLINDER MECHANICAL STOPPER

(71) Applicant: Asetek Danmark A/S, Aalborg East (DK)

(72) Inventors: André Sloth Eriksen, Nibe (DK); Kim Henriksen, Lundeborgvej (DK)

(73) Assignee: ASETEK DANMARK A/S, Aalborg East (DK)

( * ) Notice: Subject to any disclaimer, the term of this patent is extended or adjusted under 35 U.S.C. 154(b) by 0 days.

(21) Appl. No.: 17/445,638

(22) Filed: Aug. 23, 2021

(65) Prior Publication Data
US 2022/0333618 A1    Oct. 20, 2022

(30) Foreign Application Priority Data

Apr. 16, 2021   (EP) .................................. 21168955

(51) Int. Cl.
*F15B 7/08*    (2006.01)
*F15B 19/00*   (2006.01)
(Continued)

(52) U.S. Cl.
CPC ................ *F15B 7/08* (2013.01); *F15B 15/02* (2013.01); *F15B 15/20* (2013.01); *F15B 19/007* (2013.01);
(Continued)

(58) Field of Classification Search
CPC ........ F15B 7/08; F15B 19/007; A63F 13/245; A63F 30/06; A63F 13/803; A63F 13/90; B60T 8/4086
See application file for complete search history.

(56) References Cited

U.S. PATENT DOCUMENTS 4,802,712 A * 2/1989 Resch ................... B60T 8/4004
                                                   303/114.1
4,949,590 A * 8/1990 Barker .................... B60T 11/22
                                                   74/513
(Continued)

FOREIGN PATENT DOCUMENTS

CN      203417459 U      2/2014
CN      112849108 A *    5/2021   ............ B60T 8/4086
(Continued)

OTHER PUBLICATIONS

International Search Report and Written Opinion from corresponding International Application No. PCT/EP2022/058795 dated Jul. 11, 2022 (15 pages).
(Continued)

*Primary Examiner* — Thomas E Lazo
(74) *Attorney, Agent, or Firm* — Finnegan, Henderson, Farabow, Garrett & Dunner, LLP

(57) ABSTRACT

A brake cylinder includes a brake cylinder housing having a master chamber, a slave chamber, and a wall disposed there between. The wall defines at least one opening configured to provide fluid communication between the master chamber and the slave chamber. The brake cylinder also includes a master piston configured to pressurize fluid in the master chamber when a brake pedal is pressed. The brake cylinder further includes a slave piston and a pressure sensor disposed in fluid communication with the slave chamber. The pressure sensor is configured to measure pressure in the slave chamber and send a signal to a processor indicating of movement of the brake pedal. When pressurizing fluid in the master chamber, the master piston is configured to drive fluid from the master chamber to the slave chamber via the at least one opening to increase pressure in the slave chamber.

18 Claims, 4 Drawing Sheets

(51) Int. Cl.
  *F15B 15/20* (2006.01)
  *F15B 15/02* (2006.01)
  *A63F 13/803* (2014.01)
  *G09B 9/04* (2006.01)
  *A63G 31/16* (2006.01)

(52) U.S. Cl.
  CPC ..... *A63F 13/803* (2014.09); *A63F 2300/8017* (2013.01); *A63G 31/16* (2013.01); *G09B 9/04* (2013.01)

(56) References Cited

U.S. PATENT DOCUMENTS

| | | | | |
|---|---|---|---|---|
| 6,267,456 | B1* | 7/2001 | Crombez | B60T 13/686 60/591 |
| 8,561,401 | B2* | 10/2013 | Klimes | B60T 7/042 60/555 |
| 8,707,820 | B2* | 4/2014 | Fujiwara | G01L 5/225 74/512 |
| 8,893,579 | B2* | 11/2014 | Fujiwara | B60T 7/042 74/512 |
| 9,442,030 | B2* | 9/2016 | Fujiwara | B60T 7/042 |
| 9,545,904 | B2* | 1/2017 | Masuda | B60T 13/662 |
| 2006/0064977 | A1* | 3/2006 | Ohlig | B60T 7/042 60/534 |
| 2007/0018498 | A1 | 1/2007 | Nakazawa | |
| 2011/0296945 | A1* | 12/2011 | Jaouen | G05G 1/60 74/512 |
| 2013/0167526 | A1* | 7/2013 | Yoshizawa | G05G 5/05 60/533 |
| 2017/0190328 | A1* | 7/2017 | Nakazawa | B60T 7/042 |
| 2019/0039590 | A1 | 2/2019 | Maruo et al. | |
| 2021/0197083 | A1* | 7/2021 | Baumgartner | A63F 13/803 |

FOREIGN PATENT DOCUMENTS

| | | |
|---|---|---|
| EP | 3072760 A1 | 9/2016 |
| JP | 2014-084091 | 5/2014 |
| JP | 2020-044925 | 3/2020 |

OTHER PUBLICATIONS

International Search Report and Written Opinion from corresponding International Application No. PCT/EP2022/058794 dated Jul. 6, 2022 (14 pages).

* cited by examiner

BRAKE CYLINDER MECHANICAL STOPPER

CROSS-REFERENCE TO RELATED APPLICATIONS

This application claims priority to European Patent Application No. 21168955.9 filed on Apr. 16, 2021. The disclosure of the above-referenced application is expressly incorporated herein by reference in its entirety.

BACKGROUND

Field of the Invention

Systems and devices consistent with the present disclosure generally relate to a brake cylinder. More particularly, systems and devices consistent with the disclosure relate to a brake cylinder for use in automotive simulators that is both cost effective to produce and provides authentic feedback when in use.

Discussion of the Related Art

Automotive simulation systems that simulate the experience of driving a car are used for both video gaming purposes as well as for training purposes for persons involved in driving, such as racing car drivers. To effectively achieve these video gaming and training purposes, the simulation provided by these automotive simulation systems must be able to replicate the experience of a real car with a high degree of accuracy and authenticity. However, designing an automotive simulation system that achieves a high degree of accuracy and authenticity is difficult and expensive to produce.

In order to make the simulation as close to reality as possible (i.e., with a high degree of accuracy and authenticity), it is important that in addition to the visual experience, user interface equipment such steering wheels and brake systems have to be equal to that which is experienced in a real car. This allows for maximum learning potential in automotive simulation systems used for training and maximum entertainment emersion potential in automotive simulation systems used for video gaming purposes. Regarding brake systems in automotive simulation systems, it is not just important that the mechanical elements, such as the brake pedals, look like those and feel like those of a real car, it is also important to have the tactile response (e.g., the feedback and feel of pressing the brake pedal) in an automotive simulation system be the same as that which is experienced in a real car.

In conventional brake systems that are used in automotive simulation systems, depressing a brake pedal compresses a liquid (such as oil) in a chamber of a main brake cylinder. The elevated pressure in this chamber is then transferred to a slave cylinder where the pressure is measured. By converting the measured pressure in this slave cylinder, an electrical signal is generated which can be used as input to a simulation program of the automotive simulation system. These components of conventional brake systems take up a lot of space within the brake systems, and the incorporation of multiple interconnected chambers connected via tubes make manufacturing such conventional brake systems expensive to produce.

In view of the foregoing, it is desirable to create a brake system that is simple and inexpensive to produce while maintaining the look and feel of a brake system in a real car.

SUMMARY OF THE INVENTION

A brake cylinder includes a brake cylinder housing including (i) a master cylinder chamber, (ii) a slave cylinder chamber, and (iii) a wall disposed between the master cylinder chamber and the slave cylinder chamber, the wall defining at least one opening configured to provide fluid communication between the master cylinder chamber and the slave cylinder chamber; a master piston at least partially disposed within the master cylinder chamber, the master piston configured to pressurize fluid in the master cylinder chamber when a brake pedal is pressed; a slave piston at least partially disposed within the slave cylinder chamber; and a pressure sensor disposed in fluid communication with the slave cylinder chamber, the pressure sensor configured to measure pressure in the slave cylinder chamber and send a signal to a processor indicating of movement of the brake pedal; wherein, when pressurizing fluid in the master cylinder, the master piston is configured to drive fluid from the master cylinder chamber to the slave cylinder chamber via the at least one opening to increase pressure in the slave cylinder chamber.

A brake system includes a base; a brake pedal pivotably connected to the base; and a brake cylinder pivotably connected to the brake pedal, the brake cylinder including: a brake cylinder housing including (i) a master cylinder chamber, (ii) a slave cylinder chamber, and (iii) a wall disposed between the master cylinder chamber and the slave cylinder chamber, the wall defining at least one opening configured to provide fluid communication between the master cylinder chamber and the slave cylinder chamber; a master piston at least partially disposed within the master cylinder chamber, the master piston configured to pressurize fluid in the master cylinder chamber when the brake pedal is depressed; a slave piston at least partially disposed within the slave cylinder chamber; and a pressure sensor disposed in fluid communication with the slave cylinder chamber, the pressure sensor configured to measure pressure in the slave cylinder chamber and send a signal to a processor indicating of movement of the brake pedal; wherein, when pressurizing fluid in the master cylinder chamber, the master piston is configured to drive fluid from the master cylinder chamber to the slave cylinder chamber via the at least one opening to increase pressure in the slave cylinder chamber.

As described above, the brake cylinder includes a brake cylinder housing with a master cylinder chamber and a slave cylinder chamber. The cylinder chambers are separated by the wall defining openings allowing liquid to pass from the master cylinder chamber to the slave cylinder chamber. The master cylinder chamber includes the master piston for connecting to a brake pedal (or similar interface), and the master piston when pushed is adapted to force liquid from the master cylinder chamber to the slave cylinder chamber via the openings. The slave cylinder chamber comprises a slave piston which is adapted to be pushed when liquid enters from the master cylinder chamber into the slave cylinder chamber.

The master cylinder chamber and the slave cylinder chamber are housed in a common brake cylinder housing. The master cylinder chamber includes the master piston which can affect a fluid which again can affect the slave piston in the slave cylinder chamber. The fluid is preferably an oil or another low-compressible liquid used in braking systems. The master cylinder chamber and the slave cylinder chamber are mutual connected via at least one opening and preferably the master cylinder chamber and the slave cylinder chamber are substantially parallel. The two chambers are only separated by a wall constituting a part of the cylinder chamber wall in both cylinder chambers. The master piston is connected with the brake pedal via a master cylinder rod, which can affect movement of the master piston. Preferably the master piston and the slave piston are arranged such that in their respective cylinder chambers, the slave piston is pushed in an opposite direction of the master piston when the master piston is pushed. In this manner a very compact design of the brake cylinder housing is achieved.

In one embodiment of the brake cylinder, the master cylinder is arranged with an internal master cylinder rod engaging with a cavity in the master piston and with a master cylinder spring surrounding the internal master cylinder rod at least along the length of the rod. The internal master cylinder rod is preferably attached to the master cylinder at the opposite end of the entrance of the master cylinder rod connected with the brake pedal. The master cylinder rod extends along the length of the master cylinder chamber into a cavity of the master piston that extends into the master cylinder rod. The internal master cylinder rod is surrounded by a master cylinder spring along its entire length and the master cylinder spring continues into the cavity of the master cylinder rod connected with the brake pedal. Thus, the master cylinder spring may serve to bring the brake pedal back to its initial position after it has been pushed. Together the internal master cylinder rod and the master cylinder spring serve to control the movement of master piston in the master cylinder chamber.

In one embodiment the slave cylinder is arranged with an internal slave cylinder rod engaging with a cavity in the slave piston and with a slave cylinder spring surrounding the internal slave cylinder rod at least along the length of the rod. The internal slave cylinder rod is preferably attached to the slave cylinder at the end toward which the slave piston is moved when the brake is depressed. The slave piston element is connected with a damping system via a slave cylinder rod. The internal slave cylinder rod is surrounded by a slave cylinder spring which serves to bring the slave piston back to an unloaded position after the brake has been released. In combination, the internal slave cylinder rod and the slave cylinder spring serve to control the movement of slave piston in the slave cylinder chamber. Preferably the slave cylinder spring and the internal slave cylinder rod continue into at least a part of the cavity in the slave piston. Preferably the slave cylinder spring also continues into a cavity in the slave cylinder rod. Thus, the slave cylinder spring may serve to control the movement of the slave cylinder rod.

The master cylinder chamber preferably includes a stop for stopping the master piston. The stop is preferably mounted at the opposite end of the entrance of the master cylinder rod. Thus, the stop is mounted at the same end in the master cylinder chamber as the internal master rod. Preferably the stop surrounds the spring and the internal rod along its length.

Also, the slave cylinder chamber preferably includes a stop for stopping the slave piston. However, this stop is mounted in the opposite end of where the internal slave rod is mounted. The stop serves to stop the movement of the slave piston in the direction of the dampening device.

As mentioned above, the cylinder chambers are separated by a wall with openings that allow fluid to pass from the master cylinder chamber to the slave cylinder chamber (the fluid can also pass through these openings from the slave cylinder chamber back into the master cylinder chamber). In one embodiment of the brake cylinder, the wall includes only one opening and preferably the opening is located both (i) next to the stop for stopping the master piston in the master cylinder chamber and (ii) next to the stop for stopping the slave piston the slave cylinder chamber. In this configuration, the opening is not blocked by the pistons, and the fluid may flow freely between the master cylinder chamber and the slave cylinder chamber (thereby, improving the operation of the brake cylinder). Both the master piston and the slave piston may be configured with recesses or rims having reduced cross section to allow flow of fluid to and from the opening.

In one embodiment of the brake cylinder, the slave cylinder chamber communicates with a pressure sensor. The pressure sensor measures the pressure of the fluid in the slave cylinder chamber, and converts this measurement into an electronic signal to be used for signaling the braking to the simulator software.

To obtain a more realistic or natural feeling of the brake, the brake cylinder may include a dampening device, and in one embodiment, the slave piston communicates with the dampening device. Preferably the dampening device is located outside the slave cylinder chamber and communicates with the slave piston via a slave cylinder rod. Preferably the dampening device includes a damper in a damper housing which cooperates with a block element connected with the slave cylinder rod. When the slave piston is activated, the block element is drawn towards the damper by the slave cylinder rod and applies pressure on the damper. The damper is capable of deforming when pressure is applied, thereby providing a dampening effect.

Preferably the damper is made from an elastomer material, such as nitril, silicone, fluorosilicone, neoprene, polyacrylate, polyurethane, polyisoprene and similar material. Preferably the dampener has a Shore A hardness in the range 30 to 90, such as in the range 40 to 80 when measured according to ASTM D2240. A hardness within such ranges provides a feeling in the brake pedal similar to the feeling of a brake pedal in a vehicle.

The present invention also relates to a brake system comprising a brake cylinder as described above for gaming and simulation.

BRIEF DESCRIPTION OF THE DRAWINGS

The accompanying drawings, which are incorporated in and constitute a part of this disclosure, illustrate various embodiments and aspects of the present disclosure. In the drawings.

DETAILED DESCRIPTION

Figure 1:
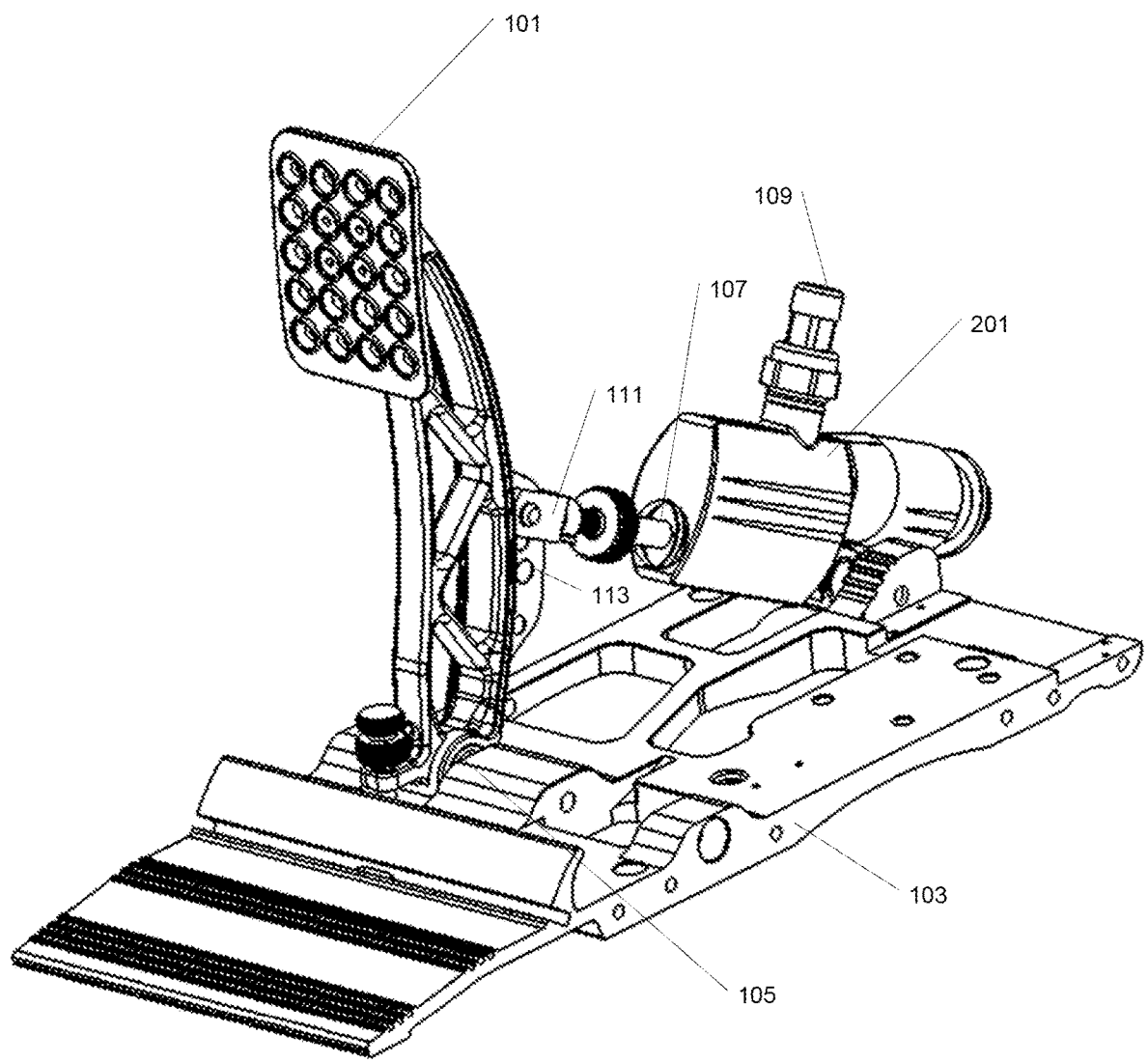
FIG. 1 illustrates a perspective view of a brake system with a brake cylinder according to an embodiment consistent with the present disclosure.

The following detailed description refers to the accompanying drawings. Wherever possible, the same reference numbers are used in the drawings and in the following description to refer to the same or similar parts. While several exemplary embodiments and features of the disclosure are described herein, modifications, adaptations, and other implementations are possible without departing from the spirit and scope of the disclosure. For example, substitutions, additions, or modifications may be made to the components illustrated in the drawings, and the exemplary methods described herein may be modified by substituting, reordering, or adding steps to the disclosed methods. Accordingly, the following detailed description does not limit the disclosure. Instead, the proper scope of the disclosure is defined by the appended claims.

Systems and devices consistent with the present disclosure generally relate to a brake cylinder. More particularly, systems and devices consistent with the disclosure relate to a brake cylinder for use in automotive simulators that is both cost effective to produce and provides authentic feedback when in use.

FIG. 1 illustrates an embodiment of brake system for use in an automotive simulation system such as a racing video game simulator or a professional racecar driver training simulator. The brake system includes a brake pedal 101 connected to a brake cylinder 201. The brake pedal 101 and brake cylinder 201 are mounted to a base or support surface 103. The brake pedal 101 is mounted via a pivot axis 105 on the base 103 having a large surface are and weight to ensure that the brake system is supported in a stable manner.

The brake system is configured to communicate with a computer system running car simulation software. Communication between the brake system and the computer system could be via wires such as USB or via wireless communication such as Bluetooth. The communication between the brake system and the computer system is preferably in real-time to ensure that any actions on the brake pedal are immediately communicated to the car simulation software to minimize lag time and provide a realistic feel for the user using the simulation software. When pressing the brake pedal 101, a master cylinder piston 107 is pushed into the brake cylinder 201 and the brake pressure is then measured and communicated back to the computer system via the sensor 109. The sensor 109 is able to detect when, how much, and how fast pressure on the brake pedal is changed. The brake cylinder 201 is connected to the brake pedal 101 by a rod clevis 207 at the end of the piston rod 205 of the master cylinder piston 107 which grips around a mount plate 113 on the arm of the brake pedal 101.

Figure 2A:
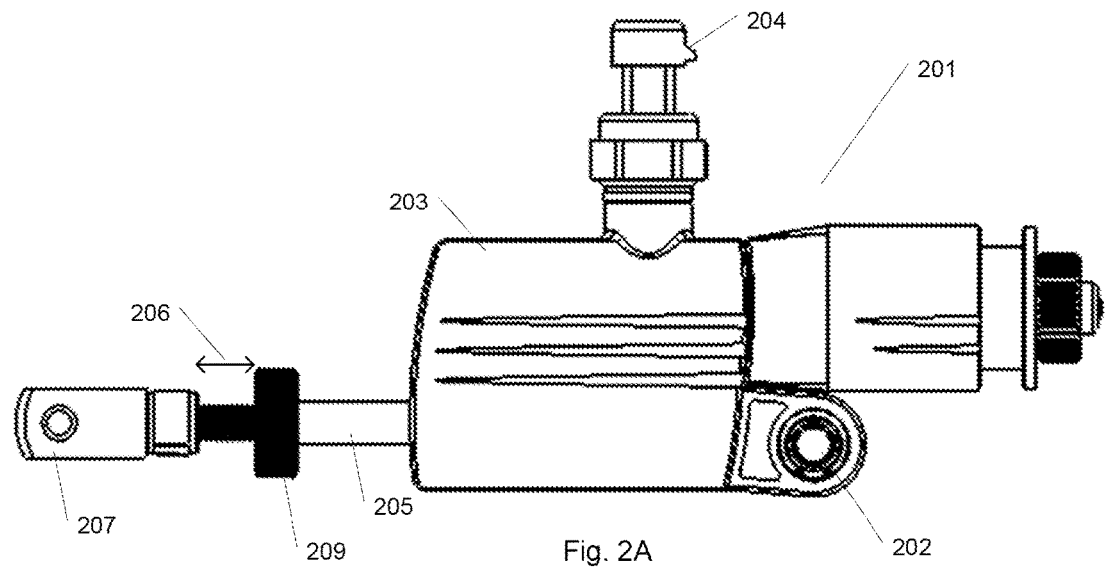
FIGS. 2A and 2B illustrate respectively a side view of the brake cylinder of FIG. 1 and a cross section of the brake cylinder of FIG. 1.
Figure 2B:
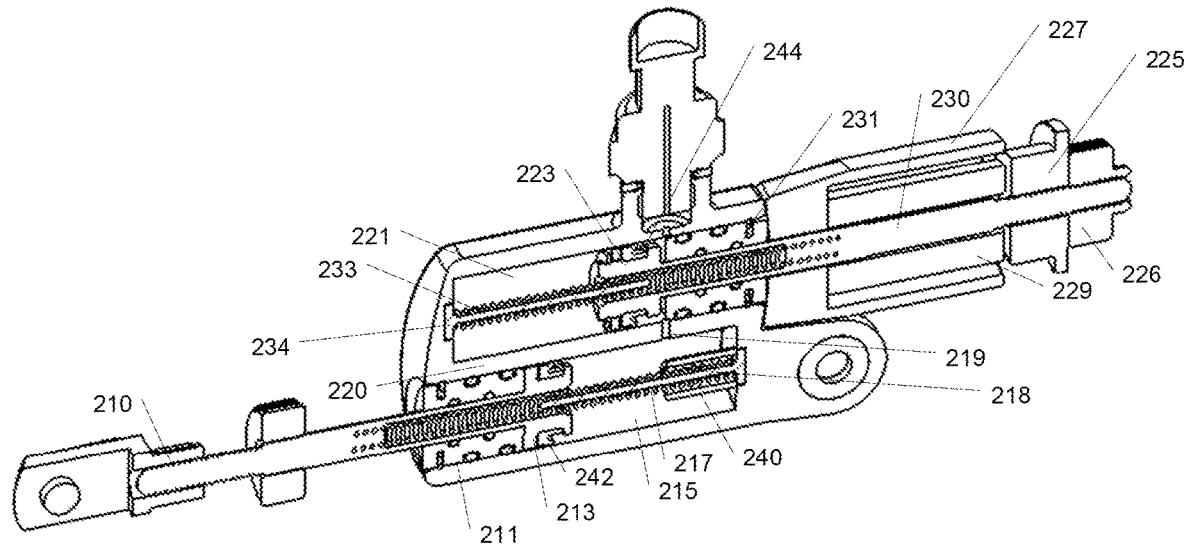

FIGS. 2A and 2B illustrate external and internal components of the brake cylinder 201. As seen in FIG. 2A, the brake cylinder 201 includes a brake cylinder housing 203 and an attachment opening 202 which can be used for mounting the brake cylinder 201 to a support system of the brake system such as the base 103. Further, at the top of the brake cylinder 201, a pressure sensor 204 is mounted for measuring pressure within the brake cylinder 201 and converting a pressure measurement into an electronic signal that can be sent to a processor of the automotive simulation system and be interpreted using the simulator software run on the processor to indicate the amount braking that should be applied to a vehicle simulated by the automotive simulation system (the electronic signal could be communicated either wireless or via wires).

As seen in FIG. 2A, attached through a lower part of the brake cylinder housing 203, a master cylinder piston 107 includes a master cylinder rod 205, a brake pedal connector 207, and a brake arm adjuster 209. The brake cylinder 201 is connected to the bread pedal 101 via the brake pedal connector 207 which may be in the form of, for example, a rod clevis. The brake arm adjuster 209 may be used for adjusting the slack in the pedal by increasing or decreasing the distance between the rod 205 and the connector 207 and for adjusting the position of the pedal 101 when not being pressed. The brake arm adjuster 209 can be used for adjusting the length of the master cylinder rod 205 by screwing the winding 210 at the end of the rod 205 either into or out of the winding 210 at the inner part of the rod clevis 207. When depressing the pedal 101 (as seen in FIG. 1) connected to the master cylinder rod 205 via the adjuster 209 and the connector 207, the master cylinder piston 107 is pushed into the brake cylinder housing 203 increasing the internal pressure of the brake cylinder 201.

As seen in FIG. 2B, a master cylinder rod guide 211 is mounted inside the housing 203 for guiding the master cylinder rod 205 of the master cylinder piston 107 and allowing movement of the rod 205 only in an axial direction. The end of the master cylinder rod 205 disposed within the housing 203 includes a piston element 213 with a seal 242. The piston element 213 can move back and forth inside a master cylinder chamber 215 where a fluid (e.g., oil or other liquid) is present. The movement of the master cylinder piston element 213 is limited by the rod guide 211 and the stop member 240 at the opposite end of the master cylinder housing 203. The stop member 240 is to ensure that fluid cannot enter from the slave cylinder chamber 221 and behind the piston element 213. The stop member 240 should therefore have a length ensuring that the master piston 107 cannot be pressed to pass the openings 219 between master and slave chambers 215, 211. A master cylinder spring 217 is also present (where one end is inserted into a hollow end of the master cylinder rod 205 and the opposite end is inserted into the hollow stop member 240) that, when compressed, applies pressure between the stop member 240 and the rod 205 ensuring that the master cylinder piston element 213 moves back to a position associated with a released orientation when pressure on the pedal 101 has been released. The master cylinder spring 217 is mounted on an internal master cylinder rod guide 218 to keep the master cylinder spring 217 in place.

As seen in FIG. 2B, the cylinder 201 additionally includes a slave chamber 221. The slave chamber 221 and the master cylinder chamber 215 are elongated cavities that are disposed substantially parallel to each other and are separated from each other by a chamber dividing wall 220. One or more openings 219 are disposed within the wall 220 to allow for fluid communication between the master cylinder chamber 215 and the slave chamber 221.

When the master cylinder piston element 213 is pressed towards the fluid inside the master cylinder chamber 215 (such as in the situation depicted in FIGS. 4A and 4B), then the fluid in the chamber 215 is forced through the one or more openings 219 in the wall 220 between the two chambers 215, 221 and into the slave cylinder chamber 221. Fluid entering the chamber 221 via the one or more openings 219 increases the pressure within the chamber 221 and pushes a slave cylinder piston element 223 connected to a slave piston rod 230 in a direction opposite that of the master cylinder piston element 213. The dimensioning and number of openings 219 should be considered to ensure a sufficient flow between the two chambers 215, 221 when fluid is pressed from the master chamber 215 to the slave chamber 221. If the passage between the two chambers 215, 221 is to small, then a high pressure force is necessary to press fluid from the master chamber 215 to slave chamber 221. In one embodiment two openings 219 each having a diameter of around 1.5 mm may be used, but these openings 219 may be larger or smaller depending on the viscosity of the fluid.

The piston seal 242, 244 for each of the master cylinder piston element 213 and the slave cylinder piston element 223 may be a u gasket. When fluid is being pressed, the lips of the u gaskets 242, 244 are pressed towards the inner walls of the cylinder chambers 215, 221. As can be seen, the u gasket 244 of the slave piston element 223 is mounted opposite the u gasket 242 of the master piston element 213, since in the master cylinder chamber 215 the fluid is in front of the piston element 213, whereas in the slave cylinder chamber 221 fluid is between the slave piston element 223 and the slave rod guide 231. Due to the u gaskets' 242, 244 seal, air is present in the master chamber 215 behind the master cylinder piston 107 and in front of the slave cylinder piston 223. In the slave chamber 221, a hole should be present at the end to ensure air is allowed to leave and enter the chamber 221 as the slave piston 223 moves back and forth.

The end of the slave piston rod 230 distal to the master cylinder piston 107 is connected to an end bolt 226 and a block element 225 via windings at the end of the slave cylinder rod 230. When the slave cylinder piston 223 is pushed by the fluid entering the slave cylinder chamber 221, the block element 225 is dragged towards and into a brake cylinder damper housing 227 and moves with the piston 223 back and forth based on pressure provided by the fluid entering the slave cylinder chamber 221. Inside the damper housing 227, a dampener 229 is positioned between the block element 225 and an inner wall of the housing 227. The dampener 229 is made from flexible, elastic material (e.g., rubber, silicone, etc.), where the flexibility of the elastic material influences the perceived softness of the pedal 101 in use. For example, a dampener 229 with greater flexibility will result in the pedal 101 being perceived as softer than when a stiffer dampener 229 with less flexibility is used. Additionally, a threaded nut may be included on the slave piston 223 next to the block element 225 on the opposite side of the dampener 229. Manipulation of the threaded nut may be used to adjust the stiffness of the brake pedal 101. The block element 225 has an edge limiting how far the block element can move into the damper house and thereby how far the brake pedal can be pressed.

In the slave cylinder chamber 221, a slave rod guide 231 is mounted inside the housing 203 for guiding the rod of the slave piston 223 and allowing movement of the piston 223 in only the axial direction. The slave cylinder piston 223 can move back and forth inside the slave cylinder chamber 221 where the fluid (e.g., oil or other liquid) is present.

A slave cylinder spring 233 is also present that, when compressed, applies pressure between an inner wall of the chamber 221 and the piston 223 ensuring that the slave cylinder piston 223 moves back to a position associated with the released orientation when pressure on the pedal 101 has been released. The slave cylinder spring 233 is mounted on the internal slave cylinder rod guide 234 to keep the slave cylinder spring 233 in place.

As seen in FIGS. 2A and 2B, the pressure sensor 204 is connected to and is in fluid connection with the chamber 221 and is configured to measure the pressure in the chamber 221 between the slave cylinder piston 223 and the slave rod guide 231.

Figure 3A:
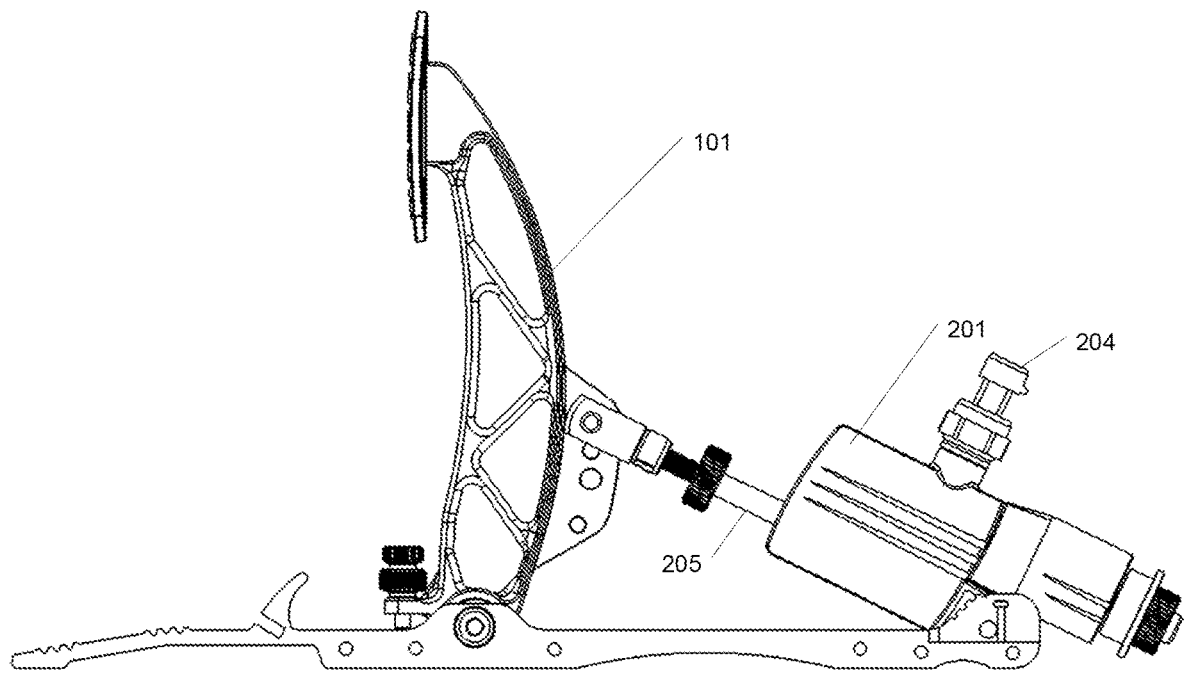
FIGS. 3A and 3B illustrate respectively a side view of the brake system of FIG. 1 in a released orientation and a cross section of the brake cylinder of FIG. 1 in the released orientation.
Figure 3B:
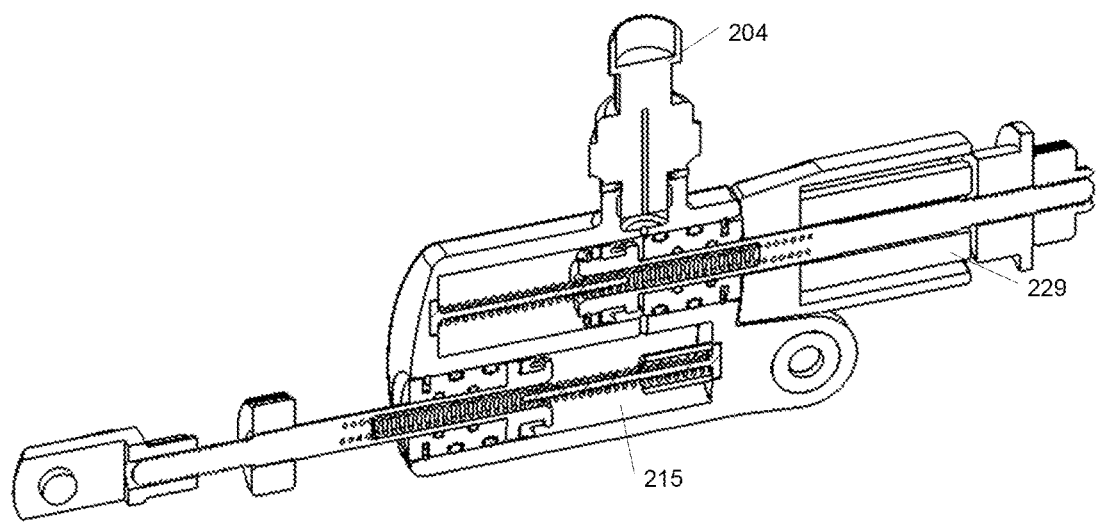

FIGS. 3A and 3B illustrates the brake system in the released orientation, where the pedal 101 is not pressed. As seen in FIG. 3A, the pedal 101 is connected to the master piston rod 205 but there is no pressure on the pedal 101. Consequently, since no pressure is applied to the master piston rod 205 from the pedal 101, the fluid remains in the master cylinder chamber 215 and does not pass through the holes 219 and into the slave cylinder chamber 221. Accordingly, since no fluid is added to the chamber 221 from the chamber 215, the pressure sensor 204 measures no increased level of pressure. Because the pressure sensor 204 does not measure an increased level of pressure in the chamber 221, the processor of the automotive simulation system does not receive any signal indicative of braking.

Figure 4A:
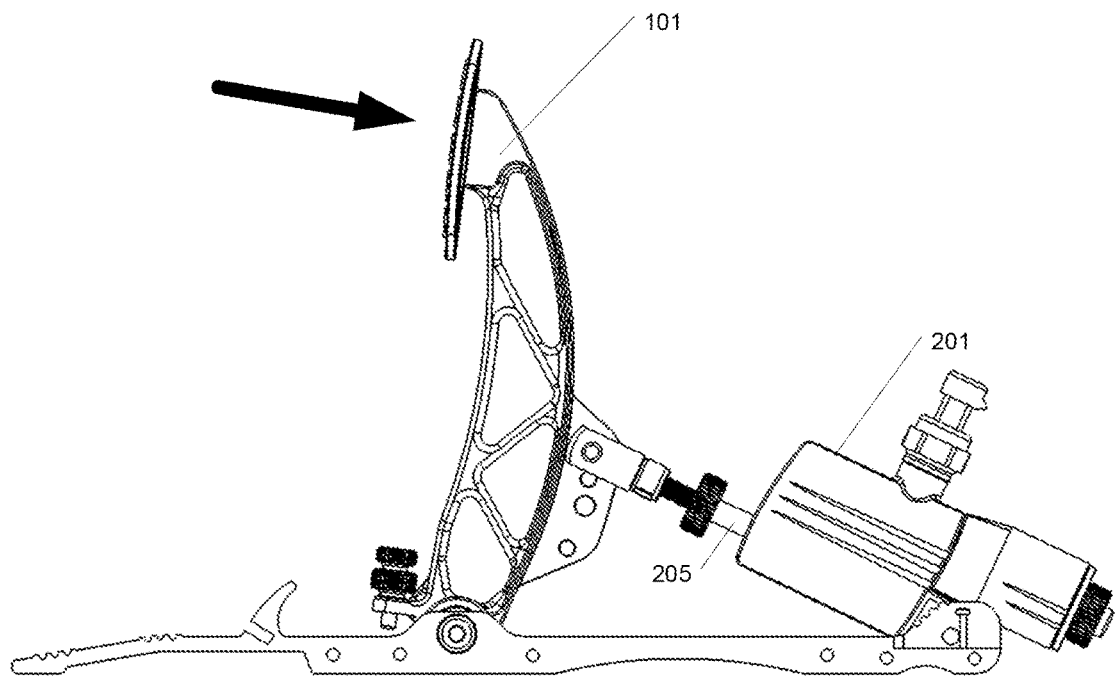
FIGS. 4A and 4B illustrate respectively a side view of the brake system of FIG. 1 in a depressed orientation and a cross section of the brake cylinder of FIG. 1 in the depressed orientation.
Figure 4B:
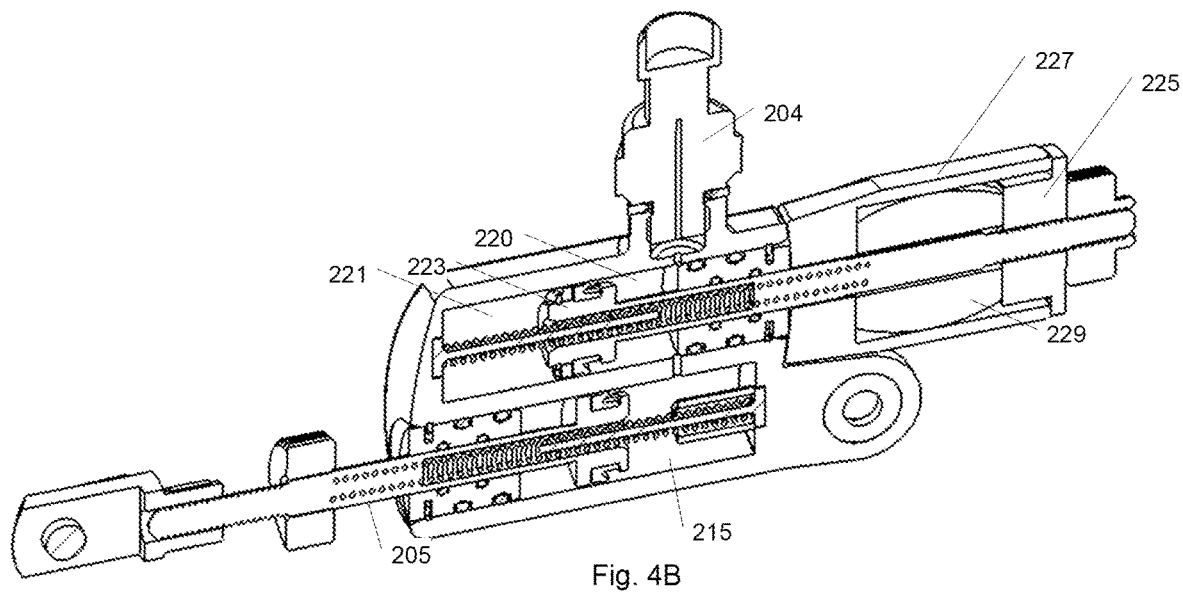

FIGS. 4A and 4B illustrates the brake system in a depressed orientation, where the pedal 101 is pressed.

As seen in FIG. 3A, the pedal 101 is connected to the master cylinder piston rod 205 and there is pressure on the pedal 101 (illustrated by black arrow). Consequently, since pressure is applied to the master piston rod 205 from the pedal 101, the fluid is pushed from the master cylinder chamber 215, through the holes 219, and into the slave cylinder chamber 221. Accordingly, since fluid has been added to the chamber 221 from the chamber 215, the slave cylinder piston 223 is pushed and an increased pressure of fluid in the area 221 in front of the slave cylinder piston 223 is measured by the pressure sensor 204. By means of the slave cylinder rod 230, when the slave piston 223 is pushed, it drags the block element 225 into the damper housing 227 and applies compressive pressure onto the dampener 229. The increased pressure causes the dampener 229 to deform which affects the movement of the slave cylinder piston 223 which again affects the entire brake system providing a feeling corresponding the feeling of a brake system in a vehicle. The deformation of the dampener 229 is an elastic deformation, and when the pressure is released, the dampener will regain its initial shape (i.e., the shape of the dampener 229 in an unloaded condition). Further the pedal 101 can be pushed no further due to the edge of the block element 225 being blocked by the edge of the damper housing 227. The resistance of the dampener 229 is felt by a user's foot on the pedal 101 and provides a tactile feedback similar to a brake of a real car. Because the pressure sensor 204 does measure an increased level of pressure in the chamber 221, the processor of the automotive simulation system receives a signal from the sensor 204 indicative of braking. Because the amount of increased pressure measured by the sensor 204 can vary with the amount of pressure applied by a user's foot on the pedal 101, the signal from the sensor will be indicative of the amount of braking that a user is applying to the pedal 101.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A brake cylinder configured to provide braking signaling to an automotive simulator, the brake cylinder comprising:

a brake cylinder housing including (i) a master cylinder chamber, (ii) a slave cylinder chamber, and (iii) a wall disposed between the master cylinder chamber and the slave cylinder chamber, the wall defining at least one opening configured to provide fluid communication between the master cylinder chamber and the slave cylinder chamber;

a master piston at least partially disposed within the master cylinder chamber, the master piston configured to pressurize fluid in the master cylinder chamber when a brake pedal is depressed;

a slave piston at least partially disposed within the slave cylinder chamber; and a pressure sensor disposed in fluid communication with the slave cylinder chamber, the pressure sensor configured to measure pressure in the slave cylinder chamber and send a signal to a processor indicating of movement of the brake pedal;

a dampener housing positioned coaxially adjacent to the slave cylinder chamber, a slave piston rod at least partially disposed within the dampener housing; and a dampener disposed within the dampener housing;

wherein the slave piston rod includes a block configured to limit axial movement of the slave piston from a first slave position to a second slave position via contact with the dampener housing; and wherein, when pressurizing fluid in the master cylinder chamber, the master piston is configured to drive fluid from the master cylinder chamber to the slave cylinder chamber via the at least one opening to increase pressure in the slave cylinder chamber.

2. The brake cylinder of claim 1, wherein the master piston is configured to have movement limited to translation along an axis of the master piston between a first master position and a second master position;

wherein the slave piston is configured to have movement limited to translation along an axis of the slave piston between the first slave position and the second slave position; and wherein the axis of the master piston and the axis of the slave piston are parallel to each other.

3. The brake cylinder of claim 2, wherein movement of the master piston from the first master position to the second master position is in a first direction and drives movement of the slave piston from the first slave position to the second slave position in a second direction; and wherein movement of the master piston from the second master position to the first master position is in the second direction and drives movement of the slave piston from the second slave position to the first slave position in the first direction.

4. The brake cylinder of claim 3, wherein movement of the slave piston from the first slave position to the second slave position compresses the dampener and movement of the slave piston from the second slave position to the first slave position decompresses the dampener.

5. The brake cylinder of claim 4 further comprising:

a master spring connected to the master piston, the master spring configured to bias the master piston towards the first master position in the second direction; and a slave spring connected to the slave piston, the slave spring configured to bias the slave piston towards the first slave position in the first direction.

6. The brake cylinder of claim 1, wherein the slave piston further includes a threaded nut;

wherein the block is disposed between the dampener and the threaded nut; and wherein the threaded nut is configured to adjust the stiffness of the brake pedal.

7. The brake cylinder of claim 1, wherein the master piston includes:

a master rod at least partially disposed within the master cylinder chamber;

a brake pedal connector configured to attach to the brake pedal; and a brake arm adjuster configured to adjust the distance between the brake pedal connector and the master rod.

8. The brake cylinder of claim 1, wherein pressure measurements of the pressure sensor are directly proportional to depression displacement of the brake pedal.

9. The brake cylinder of claim 1, wherein the brake cylinder housing includes an attachment opening configured to attach the brake cylinder to a base.

10. A brake system configured to provide braking signaling to an automotive simulator, the brake system comprising:

a base;

a brake pedal pivotably connected to the base; and a brake cylinder pivotably connected to the brake pedal, the brake cylinder including:

a brake cylinder housing including (i) a master cylinder chamber, (ii) a slave cylinder chamber, and (iii) a wall disposed between the master cylinder chamber and the slave cylinder chamber, the wall defining at least one opening configured to provide fluid communication between the master cylinder chamber and the slave cylinder chamber;

a master piston at least partially disposed within the master cylinder chamber, the master piston configured to pressurize fluid in the master cylinder chamber when the brake pedal is depressed;

a slave piston at least partially disposed within the slave cylinder chamber;

a pressure sensor disposed in fluid communication with the slave cylinder chamber, the pressure sensor configured to measure pressure in the slave cylinder chamber and send a signal to a processor indicating of movement of the brake pedal;

a dampener housing positioned coaxially adjacent to the slave cylinder chamber, a slave piston rod at least partially disposed within the dampener housing; and a dampener disposed within the dampener housing;

wherein the slave piston rod includes a block configured to limit axial movement of the slave piston from a first slave position to a second slave position via contact with the dampener housing; and wherein, when pressurizing fluid in the master cylinder chamber, the master piston is configured to drive fluid from the master cylinder chamber to the slave cylinder chamber via the at least one opening to increase pressure in the slave cylinder chamber.

11. The brake system of claim 10, wherein the master piston is configured to have movement limited to translation along an axis of the master piston between a first master position and a second master position, wherein the slave piston is configured to have movement limited to translation along an axis of the slave piston between the first slave position and the second slave position; and wherein the axis of the master piston and the axis of the slave piston are parallel to each other.

12. The brake system of claim 11, wherein movement of the master piston from the first master position to the second master position is in a first direction and drives movement of the slave piston from the first slave position to the second slave position in a second direction; and wherein movement of the master piston from the second master position to the first master position is in the second direction and drives movement of the slave piston from the second slave position to the first slave position in the first direction.

13. The brake system of claim 12, wherein movement of the slave piston from the first slave position to the second slave position compresses the dampener and movement of the slave piston from the second slave position to the first slave position decompresses the dampener.

14. The brake system of claim 13, wherein the brake cylinder further includes:
- a master spring connected to the master piston, the master spring configured to bias the master piston towards the first master position in the second direction; and
- a slave spring connected to the slave piston, the slave spring configured to bias the slave piston towards the first slave position in the first direction.

15. The brake system of claim 10, wherein the slave piston further includes a threaded nut;

wherein the block is disposed between the dampener and the threaded nut; and wherein the threaded nut is configured to adjust the stiffness of the brake pedal.

16. The brake system of claim 10, wherein the master piston includes:
- a master rod at least partially disposed within the master cylinder chamber;
- a brake pedal connector configured to pivotably connect to the brake pedal; and
- a brake arm adjuster configured to adjust the distance between the brake pedal connector and the master rod.

17. The brake system of claim 10, wherein pressure measurements of the pressure sensor are directly proportional to depression displacement of the brake pedal.

18. The brake system of claim 10, wherein the brake cylinder housing includes an attachment opening configured to pivotably attach the brake cylinder to the base.

* * * * *

UNITED STATES PATENT AND TRADEMARK OFFICE
CERTIFICATE OF CORRECTION

PATENT NO. : 11,680,587 B2  
APPLICATION NO. : 17/445638  
DATED : June 20, 2023  
INVENTOR(S) : André Sloth Eriksen et al.

Page 1 of 1

It is certified that error appears in the above-identified patent and that said Letters Patent is hereby corrected as shown below:

In the Claims

Claim 1, Column 9, Line 9, "cylinder chamber; and" should read --cylinder chamber;--.

Signed and Sealed this  
Twenty-sixth Day of September, 2023

Katherine Kelly Vidal  
*Director of the United States Patent and Trademark Office*